United States Patent
Byrne et al.

(10) Patent No.: US 11,144,180 B2
(45) Date of Patent: *Oct. 12, 2021

(54) EXTENSIBILITY FEATURES FOR ELECTRONIC COMMUNICATIONS

(71) Applicant: Microsoft Technology Licensing, LLC, Redmond, WA (US)

(72) Inventors: Warren Randall Byrne, Esparto, CA (US); Justin Bradley Mahood, Redmond, WA (US); Ryan Edward Gregg, Seattle, WA (US); Jason Todd Henderson, Tocoma, WA (US); Andrew Salamatov, Seattle, WA (US); David Claux, Redmond, WA (US); Oleg Ouliankine, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,643

(22) Filed: Feb. 21, 2019

(65) Prior Publication Data

US 2019/0179518 A1 Jun. 13, 2019

Related U.S. Application Data

(63) Continuation of application No. 15/383,226, filed on Dec. 19, 2016, now Pat. No. 10,241,657, which is a
(Continued)

(51) Int. Cl.
*G06F 3/0484* (2013.01)
*G06Q 10/10* (2012.01)
(Continued)

(52) U.S. Cl.
CPC ......... *G06F 3/04842* (2013.01); *G06Q 10/10* (2013.01); *G06Q 50/32* (2013.01);
(Continued)

(58) Field of Classification Search
None
See application file for complete search history.

(56) References Cited

U.S. PATENT DOCUMENTS 7,831,676 B1 * 11/2010 Nagar .................. G06Q 10/107
709/206
9,032,066 B1 * 5/2015 Erdmann ................ G06F 21/53
709/224
(Continued)

FOREIGN PATENT DOCUMENTS

CN 101036133 A 9/2007
CN 101454774 A 6/2009
(Continued)

OTHER PUBLICATIONS

Ongtang, Machigar, Kevin Butler, and Patrick McDaniel. "Porscha: Policy oriented secure content handling in Android." In Proceedings of the 26th annual computer security applications conference, pp. 221-230. 2010. (Year: 2010).*
(Continued)

*Primary Examiner* — Frank D Mills
(74) *Attorney, Agent, or Firm* — Merchant & Gould P.C.

(57) ABSTRACT

An extensibility model is used to provide active and interactive functionality in communication items, but the embodiments are not so limited. A computer system of an embodiment includes components configured to identify one or more activation triggers that operate to activate gadget code using an isolated code execution environment as part of injecting content into an email communication. A method of one embodiment provides an extensibility framework for
(Continued)

using defined gadget triggers and associated gadget functionality as part of automatically injecting content inline with a mail message.

20 Claims, 11 Drawing Sheets

Related U.S. Application Data continuation of application No. 13/103,614, filed on May 9, 2011, now Pat. No. 9,524,531.

(51) Int. Cl.
*G06Q 50/32* (2012.01)
*H04L 12/26* (2006.01)
*H04L 12/58* (2006.01)
*H04L 29/08* (2006.01)

(52) U.S. Cl.
CPC .............. *H04L 43/08* (2013.01); *H04L 51/22* (2013.01); *H04L 67/02* (2013.01)

(56) References Cited

U.S. PATENT DOCUMENTS

| 2005/0114671 | A1* | 5/2005 | Little | H04L 51/063 |
| | | | | 713/182 |
| 2005/0177635 | A1* | 8/2005 | Schmidt | G06F 9/52 |
| | | | | 709/226 |
| 2007/0239662 | A1 | 10/2007 | Fontes et al. | |
| 2007/0244980 | A1* | 10/2007 | Baker, III | G06Q 10/107 |
| | | | | 709/207 |
| 2008/0005247 | A9* | 1/2008 | Khoo | G06F 3/0482 |
| | | | | 709/206 |
| 2009/0282483 | A1* | 11/2009 | Bennett | H04L 63/1408 |
| | | | | 726/23 |
| 2011/0047220 | A1* | 2/2011 | Lee | G06Q 10/107 |
| | | | | 709/206 |
| 2011/0179362 | A1* | 7/2011 | Craddock | H04L 51/08 |
| | | | | 715/752 |

FOREIGN PATENT DOCUMENTS

| CN | 101957749 A | 1/2011 |
| JP | 2008547114 A | 12/2008 |
| KR | 20030051219 A | 6/2003 |
| KR | 20080028877 A | 4/2008 |
| KR | 20100087131 A | 8/2010 |
| KR | 20110086840 A | 8/2011 |

OTHER PUBLICATIONS

"Office Action Issued in Korean Patent Application No. 10-2014-7029158", dated May 21, 2019, 19 Pages.
"Summons to Attend Oral Hearing Issued in European Patent Application No. 13718715.9", Mailed Date: Dec. 11, 2018, 10 Pages.
"Office Action Issued in Korean Patent Application No. 10-2014-7021310", dated Jun. 17, 2019, 12 Pages.
"Notice of Allowance Issued in Korean Patent Application No. 10-2014-7029158", dated Jul. 30, 2019, 5 Pages.
"Office Action Issued in European Patent Application No. 13718741.5", dated Jan. 27, 2020, 5 Pages.
"First Office Action and Search Report Issued in Chinese Patent Application No. 201810795039.5", dated Mar. 3, 2021, 13 Pages.

* cited by examiner

EXTENSIBILITY FEATURES FOR ELECTRONIC COMMUNICATIONS

CROSS REFERENCE TO RELATED APPLICATIONS

This application is a continuation of U.S. patent application Ser. No. 15/383,226, filed Dec. 19, 2016, entitled "Extensibility Features for Electronic Communications," and now U.S. Pat. No. 10,241,657, which is a continuation of U.S. patent application Ser. No. 13/103,614, filed May 9, 2011, entitled "Extensibility Features for Electronic Communications," and now U.S. Pat. No. 9,524,531, the disclosures of each of which are incorporated by reference herein in their entirety.

BACKGROUND

Advances in communication networks (e.g., internet protocol, cellular, etc.) and associated user devices/systems provide a mechanism for potentially rich interactive applications. Today's advanced communication infrastructure enables users to use many different types of devices/systems, such as desktop, portable computers, and smart phones as examples, to access and disseminate information from almost any location. Wireless and mobile capabilities currently play a key role in many settings due in part to the reasonable cost of devices and service access. With the availability of a wide variety of media types, add-in components are often used to provide additional interactive features and functionality. Add-ins are generally not self-contained and can hurt machine performance, interrupt and delay the user experience, include complicated installation dialogs and may require one or more installers. Unfortunately, add-ins are generally cumbersome to install and may sometimes be used to gain unrestricted access to an associated object model and system resources.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide an extensibility model used in part to provide active and interactive functionality in communication items, but the embodiments are not so limited. In an embodiment, a computer system includes components configured to identify one or more activation triggers that operate to activate gadget code using an isolated code execution environment as part of injecting content into an email communication. A method of one embodiment provides an extensibility framework for using defined gadget triggers and associated gadget functionality as part of automatically injecting content inline with a mail message. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 5A-5F depict aspects of an exemplary email application interface used in part to provide extensibility features.

DETAILED DESCRIPTION

Figure 1:
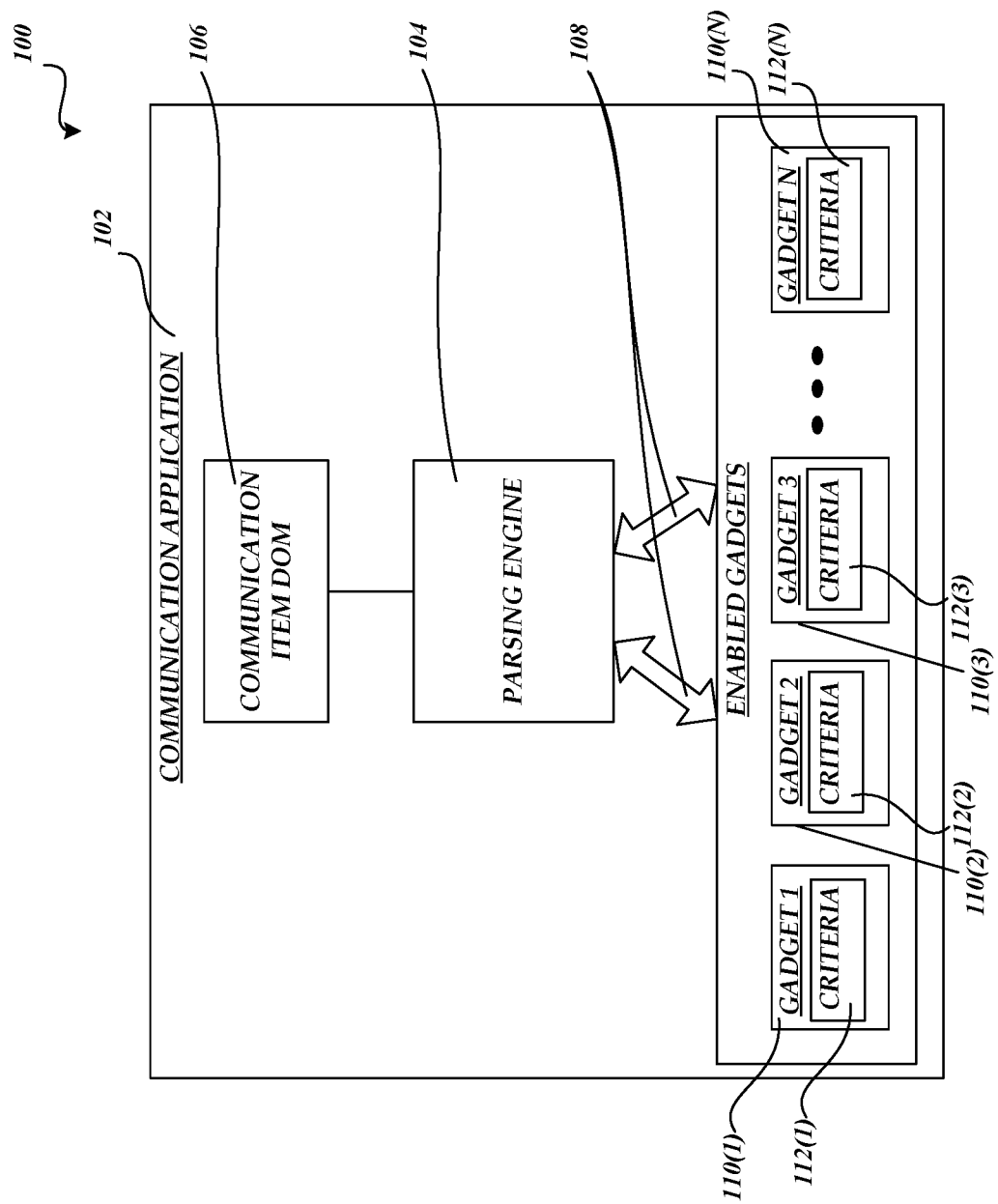
FIG. 1 is a block diagram of an exemplary computing system.

FIG. 1 is a block diagram depicting an exemplary computing system 100 configured in part to provide extensibility features for electronic communications, but is not so limited. The system 100 of an embodiment includes computer processing, storage, and other components/resources that provide communication functionality and features, including extended email messaging features as described below. A parsing engine of an embodiment can be configured to parse selected communications and identify one or more activation or gadget triggers that, when identified, trigger or activate one or more particular communication extensions or gadgets.

The parsing engine of one embodiment can use a solution package manifest that includes one or more gadget triggers to determine whether to activate scripting language code associated with the solution package using an isolated sandbox environment. For example, the parsing engine can use one or more regular expressions contained in a solution manifest file as one or more triggers that enable identification of particular communication item portions (e.g., string, link, metadata, etc.) as part of activating one or more associated gadgets that operate to inject active and interactive content as part of an electronic communication item display.

In an embodiment, the extensibility model uses the parsing engine in conjunction with a selected email message (e.g., clicked messaged for example) and the solution manifest to parse a body portion (e.g., plain text, hypertext markup language (HTML), extensible markup language (XML), etc.) of a selected email message as part of identifying information in the body portion that satisfies a particular trigger in the solution manifest. In one embodiment, the system 100 includes a number of available extensions or gadgets, that, when activated, can be used in conjunction with an email application, including web-based applications and local application installations, to automatically provide extended inline active and/or interactive content functionality to an application user.

As shown in FIG. 1, the exemplary system 100 includes a communication application 102, such as an email or messaging application for example, a parsing engine 104, a communication item document object model (DOM) 106, such an HTML email item DOM, and one or more application programming interfaces (APIs) 108 coupled to the parsing engine 104, and a number of available extensions and/or gadgets 110(1), 110(2), 110(3), . . . , 110(N), where N is an integer. The parsing engine 104 can use the regular expression triggers as part of determining whether to unpack a solution package and inject the associated extension functionality into the communication item.

For example, the parsing engine 104 can be configured as an HTML rendering engine configured to render HTML email parts as part of identifying one or more gadget activation triggers from inbound and/or received email messages. As shown, in one embodiment, each available gadget has a corresponding activation trigger (e.g., criteria 112(1), 112(2), 112(3), . . . , 112(N)). It will be appreciated that the number of available gadgets can be dependent upon user control and/or preference and/or availability. In one embodiment, the activation criteria or conditions for a particular extension can be based on a number of regular expression triggers embodied in a markup language manifest file. For example, regular expressions can be used as triggers when identifying strings of interest, such as words, terms, and/or simple and/or complex patterns of characters or other items.

In certain embodiments, gadgets and/or the associated functionality can be installed locally or accessed over a computer network, such as a global messaging communication network. As described below, a user can use a gadget selection interface as part of affirmatively selecting particular gadgets to be used with communication items, such as selected email message (see FIG. 5A for example). For example, gadgets can be activated once a user has selected particular gadgets to thereby surface extended interactive functionality for selected communication items based in part on one or more parsing operations. As described briefly above, the exemplary system 100 can be configured as a locally installed communication application (e.g., an installed email application), or as a web-based communication application (e.g., browser-based email application).

In an embodiment, an extension or gadget can be configured to provide active content features and functionality within the framework of an electronic messaging application for use with desktop, laptop, tablet, smartphone, and other computing devices that include the use of processor and memory resources to provide communication and interactive application functionality. In one embodiment, available extension features or gadgets can be configured as a compressed and/or encrypted file (e.g., a zip file) that includes one or more of HTML, cascading style sheets (CSS), and/or scripting (e.g., VISUAL BASIC, JAVASCRIPT, etc.) features.

Once activated, one or more enabled gadgets can be configured to interact with other computer components (e.g., servers, etc.) to acquire and/or use certain extension or gadget features. For example, a user might use a browser-based email application to download and select a message that includes a hyperlink in the body of the selected email message. For this illustrative example, once the parsing engine identifies the particular hyperlink, an enabled gadget associated with the hyperlink can automatically reach out to the computer network or to local resources, and embed the associated active content or functionality inline in the body of the associated email message, either replacing the hyperlink with the active and interactive functionality, or locating the extension functionality adjacent to the hyperlink. For example, scripts associated with an activated gadget can be automatically injected into the body of a rendered email, and run on the fly.

According to an embodiment, activation and/or use of one or more activation extensions or gadgets causes execution of scripting language or other executable code using an isolation sandbox or isolated code execution environment. The isolation sandbox can be configured to interact with other components when executing code requests untrusted content from a third party for example as part of replacing an identified portion of an email message with active content according to a particular activation trigger.

Untrusted code that is typically completely independent of the isolation sandbox can be transformed or otherwise controlled to conform with a particular security or execution policy. For example, control in the isolation sandbox can include conversion of one or more of HTML, CSS and script code into code that executes with a messaging application, including controlling the injection of active and/or interactive content inline with an electronic message, such as part of a preview or viewing window or pane used to display the controlled content. As discussed above, one or more of criteria 112(1)-criteria 112(N) can be used to control whether to allow, deny, or use another implementation or tool as part of an inline injection control and extensibility feature.

Figure 2:
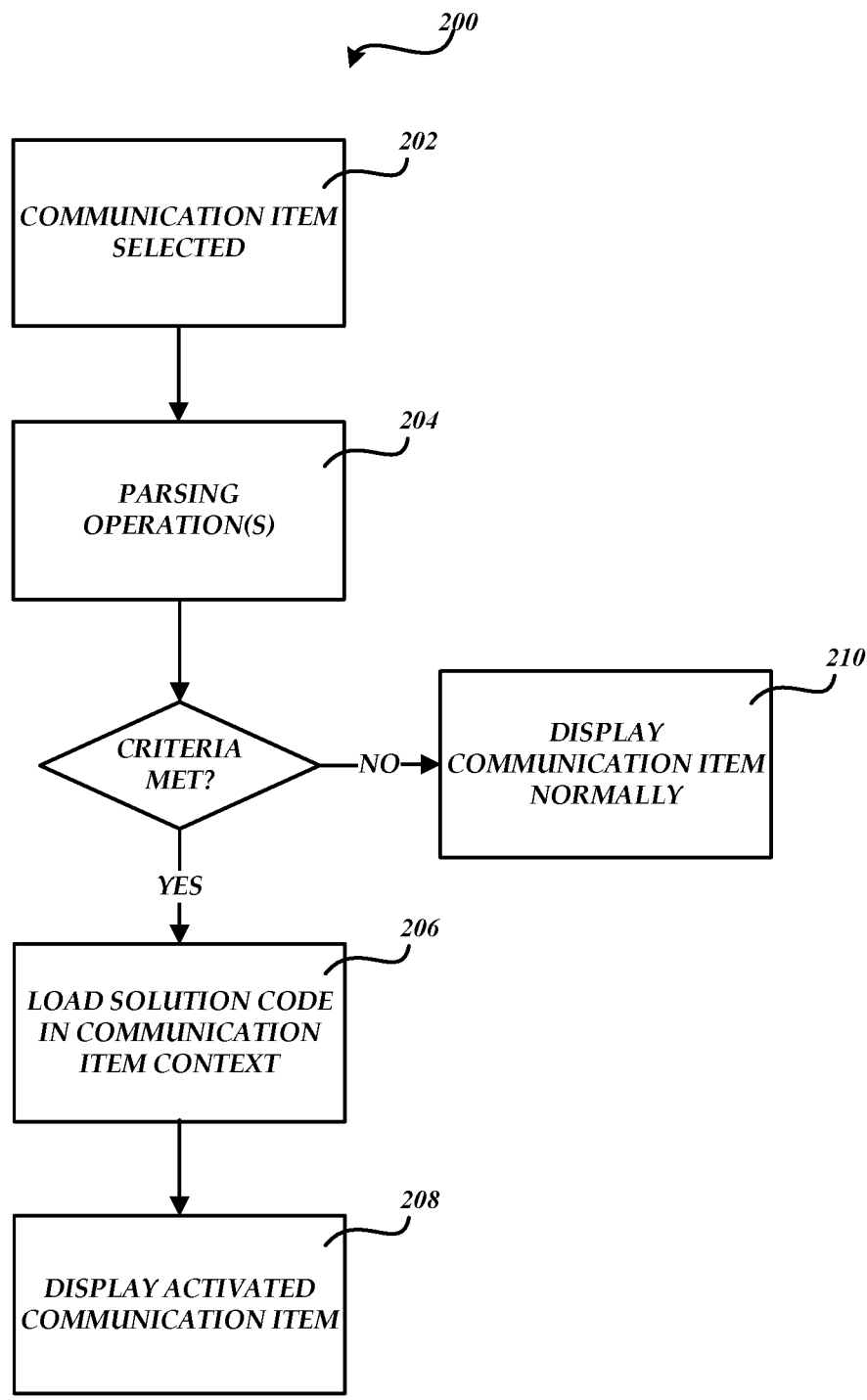
FIG. 2 is a flow diagram depicting an exemplary process of providing an activation model to control use of application extensions or gadgets.

FIG. 2 is a flow diagram depicting an exemplary process 200 of providing an activation model to control use of application extensions or gadgets as part of using an electronic communication application, but is not so limited. For example, the activation model can be used in conjunction with an email messaging application to control injection of active content in selected email messages based in part on identification of one or more activation triggers. In one embodiment, the process 200 can be used as part of controlling activation of active and interactive content as part of providing additional features for an email application. For example, the process 200 can be used to activate isolated code as part of embedding interactive content inline with a body of a selected email message.

The process 200 at 202 operates when a user selects an electronic communication item, such as an email message for example displayed in a list of email messages for example. In an embodiment, one or more extensions or gadgets can be pre-coded, packaged, and/or used on the fly as part of providing extended electronic communication functionality. In one embodiment, a particular gadget or extension can be configured as a solution package that includes a manifest (e.g., XML manifest), markup/code definition (e.g., HTML/CSS/JAVASCRIPT definition), and/or one or more embedded or web resources (e.g., icons, labels, etc.).

Figure 5A:
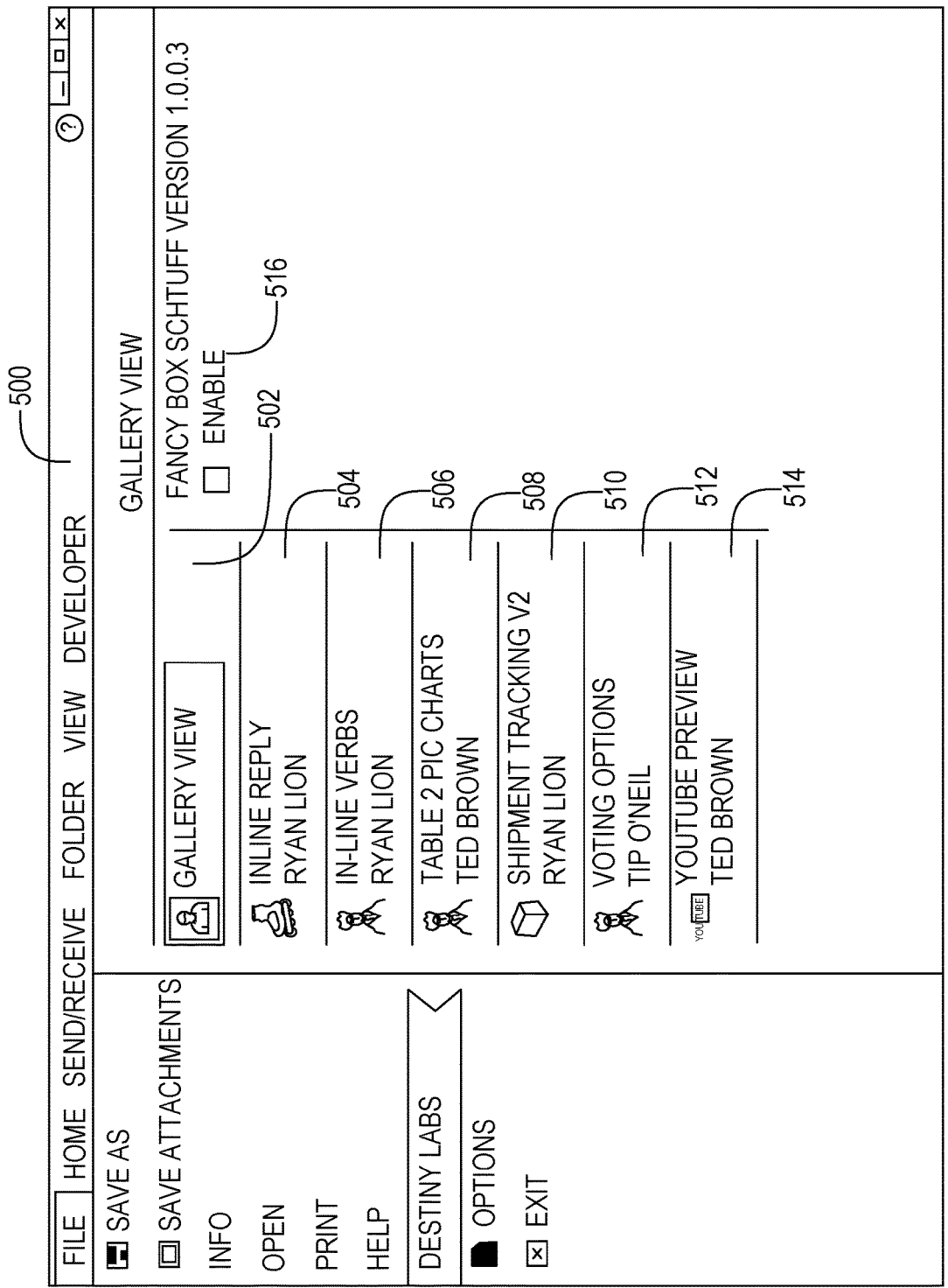

As an example, the process 200 at 202 can operate after launching an email application and/or enabling one or more gadgets (see FIG. 5A showing exemplary available gadgets) using a smartphone, desktop, or laptop browser or a locally installed email application, and selecting an email message in a list of received items. In an alternative embodiment, the process 200 at 202 operates to process email messages before an affirmative message interaction (e.g., item click, tap, etc.) by an end-user (e.g., using a dedicated server). For example, the process 200 can operate before email messages are conveyed to a user inbox.

At 204, the process 200 operates to parse one or more portions of a selected electronic communication item. In an embodiment, the process 200 at 204 uses an integrated parsing engine configured to perform parsing operations on selected email messages as part of identifying one or more activation triggers associated with one or more available and/or enabled extensions or gadgets. For example, the process 200 at 204 can use a parsing engine to parse the markup of an email message body of a selected email when identifying and using one or more defined gadget activation triggers to provide active content inline as part of a message view or preview function.

In one embodiment, the process 200 at 204 operates to parse a selected electronic communication item to identify various gadget activation triggers as part of triggering an embedding of active and interactive content with the electronic communication. For example, the process 200 at 204 can use a solution manifest that defines gadget activation triggers (e.g., regular expressions, dates, times, links, source languages, sender domain, message type, etc.) used in part to identify parsed communication portions that trigger activation of code from an isolation sandbox as part of a viewing or other operation. In one embodiment, a solution manifest can be packaged along with solution code and/or one or more embedded resources and compressed and/or encrypted as part of providing activation control features.

At 206, if the triggering criteria is met based on the parsing operation(s), the process 200 operates to load solution code associated with an activated extension or gadget in the context of the electronic the communication item. For example, upon satisfying a particular gadget activation trigger, such as a defined regular expression for example, the process 200 at 206 can operate to load the solution HTML and JAVASCRIPT in an email context which can be used as part of displaying active content in a previewer or other message viewing window.

At 208, the process 200 operates to display the now activated electronic communication item that includes the extension functionality defined by an associated solution package. For example, the process 200 at 208 can operate to display an activated and extended HTML email message based on a defined gadget activation according to a corresponding regular expression definition. If the criteria is not met, the process 200 proceeds to 210 and the electronic communication is displayed normally without any extension features added thereto. For example, if activation criteria is not satisfied according to one or more XML manifest files, the process 200 at 210 can operate to display an email message that includes an unmodified HTML body portion. While a certain number and order of operations is described for the exemplary flow of FIG. 2, it will be appreciated that other numbers and/or orders can be used according to desired implementations.

Figure 3A:
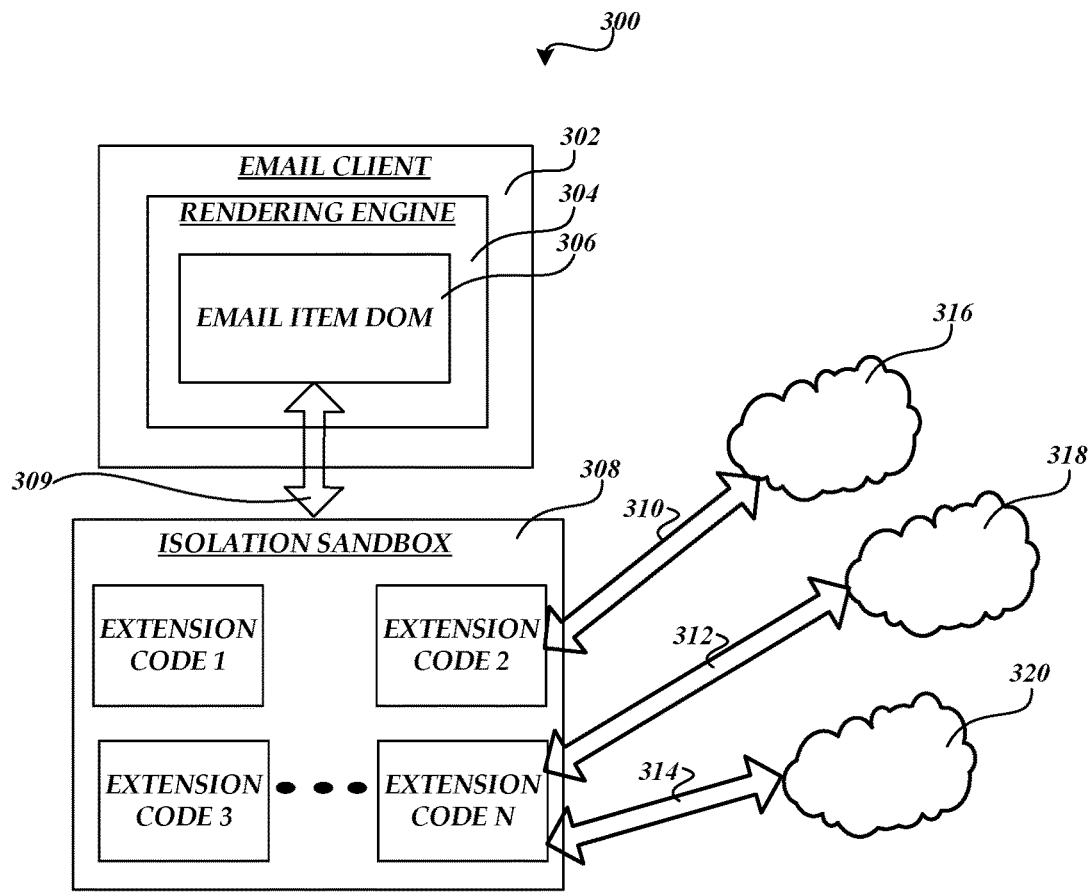
FIGS. 3A-3B depict block diagrams of components of an exemplary system configured to provide inline extensibility features for an email communication environment.
Figure 3B:
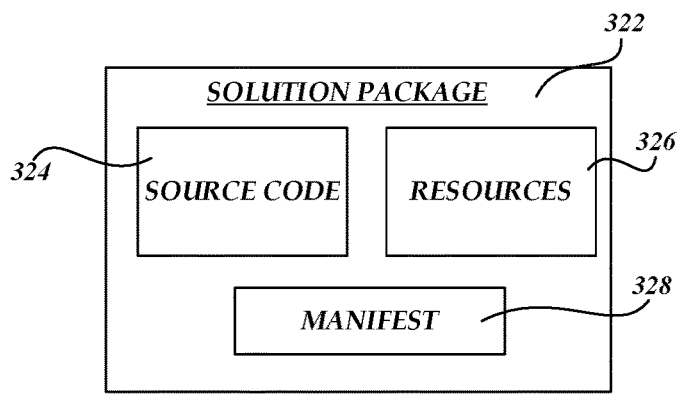

FIGS. 3A-3B depict block diagrams of components of an exemplary system 300 configured to provide inline extensibility features for an email communication environment. As shown in FIG. 3A, the exemplary system 300 includes an email client 302, including local and/or web-based email applications, a rendering or parsing engine 304, such as an HTML rendering engine for example, an email item DOM 306, and/or an isolation sandbox 308. While the isolation sandbox 308 for this exemplary system is shown as a separate component, in other embodiments, the isolation sandbox 308 can be included as part of the email client functionality. Moreover, extension code can be dynamically loaded and/or removed from the isolation sandbox 308 according to a particular implementation configuration and/or preference.

As described above, once an extension is invoked, the associated extension code can be executed from the isolation sandbox 308. For this example, extension code is illustratively shown as being isolated from the email item DOM 306. According to one embodiment, an API 309 is coupled between the isolation sandbox 308 and email item DOM 306, acting as a gateway to control the flow of information therebetween. Exemplary communication links 310, 312, and 314 are illustrative of abilities of isolated extension code to push and/or pull information from various resources, including cloud services 316, global computer/communication network 318, and intranet 320, respectively.

FIG. 3B depicts an exemplary solution package 322 used as part of providing inline extensibility features for an email item. As shown in FIG. 3B, the solution package 322 of an embodiment includes source code 324, one or more embedded resources 326, and a manifest 328. In an embodiment, one or more activation triggers can be included with the manifest 328 and used to trigger inline extensibility for a selected email item. For example, one or more activation triggers can be included in the manifest 328 embodied as one or more regular expression constructs that are used to trigger an injection of active content inline with a selected email item. In an embodiment, portions of the solution package can be stored in one or more remote and/or local locations.

The rendering engine 304 can use embodied regular expressions defined in the manifest 328 as part of determining whether to unpack a solution package and automatically embed the associated extension functionality defined by the solution package into a selected email item. For example, a regular expression can be used as a trigger to add contextual information directly into a reading pane for a mail message including injecting HTML-based content inline with a selected mail message, wherein the inline content can be displayed using a message inspection window or a reading pane of a browser window.

The system 300 of one embodiment provides inline extensibility features for a messaging interface using HTML/CSS data and JAVASCRIPT code contained in a compressed file (e.g., .zip file) and stored as part of a user's mailbox (e.g., a hidden message in a user's mailbox). The rendering engine 304 operates to recognize a valid activation context for activating the extensibility features. For such an embodiment, upon activation, JAVASCRIPT code runs in the isolation sandbox 308 to generate HTML code that is displayed inline in the reading pane for the selected email message or in an associated viewing window for the message.

As an example, the rendering engine 304 can operate and use message properties (e.g., subject, sender, recipients, categories, message verbs such as reply, reply all, forward, etc.) associated with a selected message to determine whether an activation trigger is true and requires activating. If true, HTML/CSS content and JAVASCRIPT code can be retrieved (e.g., from a hidden message), unzipped, and/or HTML contextual content is rendered inline as part of interacting with the selected message. As such, the activation model allows only restricted access to message contents and includes running the JAVASCRIPT code in isolation.

In one embodiment, the solution package 322 includes JAVASCRIPT code and HTML content that is unpacked, and then the JAVASCRIPT code is loaded in the isolation sandbox 308. The JAVASCRIPT code can be coded to obtain additional name-value pairs for a selected message to return a markup stream (e.g., HTML stream) to the associated email application for display in a message reading pane or other viewer when viewing a selected message. In one embodiment, once an extension is activated, the JAVASCRIPT code can be initialized and determine specified ObjectContexts as JAVASCRIPT Object Notation (JSON) name/value pairs, wherein the JAVASCRIPT code runs in isolation and prepares the HTML for display.

Figure 4:
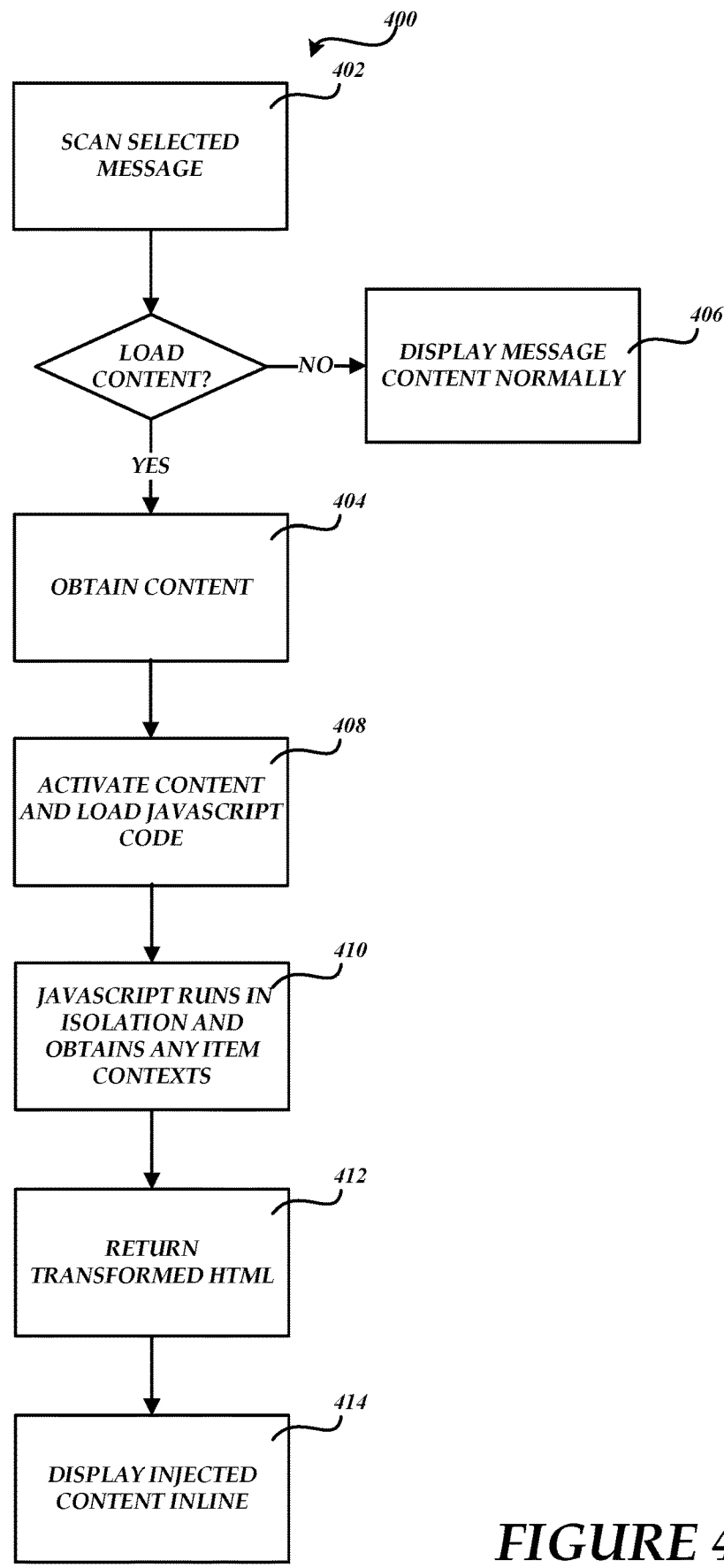
FIG. 4 is a flow diagram depicting an exemplary process of using an extensibility model to provide inline content using one or more gadgets as part of providing electronic messaging features.

FIG. 4 is a flow diagram depicting an exemplary process 400 of using an extensibility model to provide inline content using one or more gadgets as part of providing electronic messaging features. For example, selected gadgets can be used in conjunction with an email application to inject active content in selected email messages based in part on identification of one or more gadget triggers. In one embodiment, the process 400 can be used as part of controlling activation of a gadget during interaction with an email message. For example, the process 400 can be used to activate isolated gadget code as part of providing interactive content within the context of a selected email message.

The process 400 at 402 operates to scan a selected email message as part of determining whether to automatically execute gadget code from an isolated code execution environment. For example, the process 400 at 402 can use local and/or remote parsing functionality to scan for regular expression triggers contained in a parsed body portion of a selected email message. As an example, the process 400 can use a solution manifest that defines gadget activation triggers as one or more regular expressions used in part to trigger activation of gadget code from an isolated code execution environment. In an embodiment, a user can preselect or enable one or more gadgets that can be triggered when a scanning operation identifies a trigger in the body of an email and activates one or more enabled gadgets to provide extended embedded content functionality for an associated selected email message.

In one embodiment, each gadget trigger can be coded in a manifest file (e.g., XML manifest containing regular expression triggers) and used when scanning an email message or messages to identify particular enabled gadget triggers. As one example, each gadget can be developed and/or coded as a solution package that includes a manifest (e.g., XML manifest), markup/code definition (e.g., HTML/CSS/JAVASCRIPT definition), and/or one or more embedded resources. Gadgets can be used in conjunction with messaging applications, including dedicated email applications, configured to operate with various computing/communication devices, such as smartphones, desktop computers, laptop computers, etc.

At 404, if the scanning operation identifies a gadget trigger, the process 400 of an embodiment operates to obtain the associated content. For example, the process 400 can use triggering criteria based an evaluation of subject, sender, recipients, and/or other message properties and, upon identifying a particular gadget trigger, obtain content and any other relevant information from a hidden email message in a user's inbox that includes a compressed file containing gadget execution code (e.g., HTML/CSS and JAVASCRIPT) and/or one or more embedded resources. In one embodiment, a hidden message can be used to provide active content inline as part of an email message view or preview. Otherwise, if no gadget trigger is identified, the process 400 proceeds to 406 and the email application operates to display message content in the reading pane or message inspector without any additional inline features provided by a particular gadget.

At 408, after identifying the gadget trigger or triggers, the process 400 operates to activate content associated with the particular triggered gadget, including loading the associated JAVASCRIPT into the isolated code execution environment. At 410, the process 400 operates by running the unpacked JAVASCRIPT code in isolation using the isolated code execution environment and/or obtaining additional item contexts (e.g., JSON name-value pairs) from the selected email message. At 412, the process 400, by way of the executing JAVASCRIPT code, returns transformed HTML modified by executing the gadget code from the isolated code execution environment. At 414, the process 400 of an embodiment operates to display injected content associated with the activated gadget inline with the email message body in the reading pane or inspector window. While a certain number and order of operations is described for the exemplary flow of FIG. 4, it will be appreciated that other numbers and/or orders can be used according to desired implementations.

As an example, a manifest file can be written using the following schema definition:

```
<?xml version="1.0" encoding="utf-8"?>
<xs:schema id="WebExtensionManifest" elementFormDefault="qualified" version="1.0"
    targetNamespace="http://schemas.microsoft.com/ webextensions/1.0"
    xmlns="http://schemas.microsoft.com/ webextensions/1.0"
    xmlns:xs="http://www.w3.org/2001/XMLSchema">
    <xs:complexType name="LocaleOverride">
        <xs:attribute name="Locale" type="xs:string" use="required">
            <xs:annotation>
                <xs:documentation>Specifies the locale this override is for.</xs:documentation>
            </xs:annotation>
        </xs:attribute>
        <xs:attribute name="Value" type="xs:string" use="required">
            <xs:annotation>
                <xs:documentation>Specifies value of the setting expressed in the specified locale.</xs:documentation>
            </xs:annotation>
        </xs:attribute>
    </xs:complexType>
    <xs:complexType name="LocaleAwareSetting">
        <xs:annotation>
            <xs:documentation>
```

Defines a setting that is locale aware, e.g. that can be specified for different locales.

```
            </xs:documentation>
        </xs:annotation>
        <xs:sequence>
            <xs:element name="Override" type="LocaleOverride" minOccurs="0" maxOccurs="unbounded">
                <xs:annotation>
                    <xs:documentation>Provides a way to specify the value of this setting in multiple additional locales.</xs:documentation>
                </xs:annotation>
            </xs:element>
        </xs:sequence>
        <xs:attribute name="DefaultValue" type="xs:string"
```

```
              use="required">
          <xs:annotation>
              <xs:documentation>Specifies the default value for this
setting, expressed in the locale specified in the WebExtension's
DefaultLocale element.</xs:documentation>
          </xs:annotation>
      </xs:attribute>
  </xs:complexType>
  <xs:simpleType name="HostAppName">
      <xs:annotation>
          <xs:documentation>
```

Defines available host applications.

```
          </xs:documentation>
      </xs:annotation>
      <xs:restriction base="xs:string">
          <xs:enumeration value="AppName1"/>
            <xs:enumeration value="AppName2"/>
            <xs:enumeration value="AppName3"/>
            <xs:enumeration value="AppName4"/>
      </xs:restriction>
  </xs:simpleType>
  <xs:complexType name="HostApp">
      <xs:annotation>
          <xs:documentation>
```

Defines a host application an Web Extension can run in.

```
          </xs:documentation>
      </xs:annotation>
      <xs:attribute name="Name" type="HostAppName" use="required">
          <xs:annotation>
              <xs:documentation>Specifies the name of the host
application.</xs:documentation>
          </xs:annotation>
      </xs:attribute>
      <xs:attribute name="MinVersion" type="xs:decimal" use="optional">
          <xs:annotation>
              <xs:documentation>Specifies the minimum version of the host application
required for the Web Extension to run.</xs:documentation>
          </xs:annotation>
      </xs:attribute>
      <xs:attribute name="MaxVersion" type="xs:decimal" use="optional">
          <xs:annotation>
              <xs:documentation>Specifies the maximum version of the host application
required for the Web Extension to run.</xs:documentation>
          </xs:annotation>
      </xs:attribute>
  </xs:complexType>
  <xs:complexType name="Rule" abstract="true"/>
  <xs:complexType name="ItemClassIs">
      <xs:annotation>
          <xs:documentation>
```

Defines a rule that evaluates to true if the item is of the specified class.

```
          </xs:documentation>
      </xs:annotation>
      <xs:complexContent>
          <xs:extension base="Rule">
              <xs:attribute name="ItemClass" type="xs:string"
                  use="required">
                  <xs:annotation>
                      <xs:documentation>Specifies the item
class      to match.</xs:documentation>
                  </xs:annotation>
              </xs:attribute>
              <xs:attribute     name="IncludeSubClasses"
type="xs:boolean"use="optional">
```

```
                  <xs:annotation>
                      <xs:documentation>Specifies whether the rule
should evaluate to true if the item is of a subclass of the specified class.
Default is false.</xs:documentation>
                  </xs:annotation>
              </xs:attribute>
          </xs:extension>
      </xs:complexContent>
  </xs:complexType>
  <xs:simpleType name="KnownEntityType">
      <xs:annotation>
          <xs:documentation>
```

Defines the entity types that can be recognized in item subjects and bodies.

```
          </xs:documentation>
      </xs:annotation>
      <xs:restriction base="xs:string">
          <xs:enumeration value="MeetingSuggestion"/>
          <xs:enumeration value="TaskSuggestion"/>
          <xs:enumeration value="Address"/>
          <!-- Complete the list as necessary -->
      </xs:restriction>
  </xs:simpleType>
  <xs:simpleType name="KnownEntityLocation">
      <xs:annotation>
```

```
          <xs:documentation>
```

Defines the locations where to look for known entities.

```
          </xs:documentation>
      </xs:annotation>
      <xs:restriction base="xs:string">
          <xs:enumeration value="FullItemBody"/>
          <xs:enumeration value="LatestResponseBody"/>
          <xs:enumeration value="Subject"/>
      </xs:restriction>
  </xs:simpleType>
```

```
        <xs:complexType name="ItemHasKnownEntity">
            <xs:annotation>
                <xs:documentation>
```

Defines a rule that evaluates to true if a the item contains a known entity.

```
                </xs:documentation>
            </xs:annotation>
            <xs:complexContent>
                <xs:extension base="Rule">
                    <xs:attribute    name="EntityType"
type="KnownEntityType" use="required">
                        <xs:annotation>
                            <xs:documentation>Specifies the type of entity that
must be found for the rule to evaluate to true.</xs:documentation>
                        </xs:annotation>
                    </xs:attribute>
                    <xs:attribute    name="Location"
type="KnownEntityLocation" use="required">
                        <xs:annotation>
                            <xs:documentation>Specifies the location where the
entity must be found for the rule to evaluate to true.</xs:documentation>
                        </xs:annotation>
                    </xs:attribute>
                </xs:extension>
            </xs:complexContent>
        </xs:complexType>
        <xs:simpleType name="PropertyName">
            <xs:annotation>
                <xs:documentation>
```

Defines property names that can be used with the PropertyContains rule.

```
                </xs:documentation>
            </xs:annotation>
            <xs:restriction base="xs:string">
                <xs:enumeration value="Subject"/>
                <xs:enumeration value="Body"/>
                <xs:enumeration value="SenderSMTPAddress"/>
                <!-- Complete the list as necessary -->
            </xs:restriction>
        </xs:simpleType>
        <xs:complexType name="ItemHasRegularExpressionMatch">
            <xs:annotation>
                <xs:documentation>
```

Defines a rule that evaluates to true if a match for the specified regular expression could be found in the item.

```
                </xs:documentation>
            </xs:annotation>
            <xs:complexContent>
                <xs:extension base="Rule">
                    <xs:attribute name="RegExName" type="xs:string"
use="required">
                        <xs:annotation>
                            <xs:documentation>Specifies the name of the regular
expression, so that it is subsequently possible to refer to it by
code.</xs:documentation>
                        </xs:annotation>
                    </xs:attribute>
                    <xs:attribute name="RegExValue" type="xs:string"
use="required">
                        <xs:annotation>
                            <xs:documentation>Specifies the actual regular
expression to find matches for.</xs:documentation>
                        </xs:annotation>
                    </xs:attribute>
                    <xs:attribute name="RegExFlags" type="xs:string"
use="optional">
                        <xs:annotation>
                            <xs:documentation>Specifies the global flags to apply
when looking for matches for the regular expression.</xs:documentation>
                        </xs:annotation>
                    </xs:attribute>
                    <xs:attribute name="PropertyName" type="PropertyName"
use="required">
                        <xs:annotation>
                            <xs:documentation>Specifies the name of the property
in which to look for matches.</xs:documentation>
                        </xs:annotation>
                    </xs:attribute>
                </xs:extension>
            </xs:complexContent>
        </xs:complexType>
        <xs:simpleType name="LogicalOperator">
            <xs:annotation>
                <xs:documentation>
```

Defines logical operators.

```
                </xs:documentation>
            </xs:annotation>
            <xs:restriction base="xs:string">
                <xs:enumeration value="And"/>
                <xs:enumeration value="Or"/>
            </xs:restriction>
        </xs:simpleType>
        <xs:complexType name="RuleCollection">
            <xs:annotation>
                <xs:documentation>
```

Defines a collection of rules and the logical operator that should be applied when evaluating them.

```
                </xs:documentation>
            </xs:annotation>
            <xs:complexContent>
                <xs:extension base="Rule">
                    <xs:sequence>
                        <xs:element    name="Rule"    type="Rule"
minOccurs="1" maxOccurs="unbounded">
                            <xs:annotation>
                                <xs:documentation>Specifies the list of rules
that this collection contains.</xs:documentation>
                            </xs:annotation>
                        </xs:element>
                    </xs:sequence>
                    <xs:attribute name="Mode" type="LogicalOperator"
use="optional">
                        <xs:annotation>
                            <xs:documentation>Specifies the logical operator
to apply when evaluating this rule collection.</xs:documentation>
                        </xs:annotation>
                    </xs:attribute>
                </xs:extension>
            </xs:complexContent>
        </xs:complexType>
        <xs:simpleType name="FormFactor">
            <xs:annotation>
                <xs:documentation>
```

Defines supported form factors.

```
                </xs:documentation>
            </xs:annotation>
            <xs:restriction base="xs:string">
                <xs:enumeration value="Mobile"/>
                <xs:enumeration value="Tablet"/>
                <xs:enumeration value="Desktop"/>
            </xs:restriction>
        </xs:simpleType>
```

-continued

```
<xs:complexType name="SourceLocation">
    <xs:annotation>
        <xs:documentation>
```

Defines the location of a source file for a given target form factor.

```
        </xs:documentation>
    </xs:annotation>
    <xs:complexContent>
        <xs:extension base="LocaleAwareSetting">
            <xs:attribute name="FormFactor" type="FormFactor"
 use="optional">
                <xs:annotation>
                    <xs:documentation>Specifies the form factor the
SourceLocation applies to.</xs:documentation>
                </xs:annotation>
            </xs:attribute>
            <xs:attribute name="DefaultWidth"
type="xs:positiveInteger" use="optional">
                <xs:annotation>
                    <xs:documentation>Specifies the width, in pixels, that
should be allocated to the Office Web Extension when this SourceLocation
is used.</xs:documentation>
                </xs:annotation>
            </xs:attribute>
            <xs:attribute name="DefaultHeight"
type="xs:positiveInteger" use="optional">
                <xs:annotation>
                    <xs:documentation>Specifies the height, in
pixels, that should be allocated to the Office Web Extension
when this SourceLocation is
used.</xs:documentation>
                </xs:annotation>
            </xs:attribute>
        </xs:extension>
    </xs:complexContent>
</xs:complexType>
```

-continued

```
<xs:complexType name="ActivationContext">
    <xs:annotation>
        <xs:documentation>
```

Defines where and under which conditions the Web Extension should be shown.

```
        </xs:documentation>
    </xs:annotation>
    <xs:sequence>
        <xs:element name="HostApp" type="HostApp"
 minOccurs="1" maxOccurs="unbounded">
            <xs:annotation>
                <xs:documentation>Specifies the list of
host applications the ActivationContext applies to.</xs:documentation>
            </xs:annotation>
        </xs:element>
        <xs:element name="SourceLocation" type="SourceLocation"
 minOccurs="1" maxOccurs="unbounded">
            <xs:annotation>
                <xs:documentation>Specifies the list of source code
locations to use when the ActivationContext is used.</xs:documentation>
            </xs:annotation>
        </xs:element>
        <xs:element name="Rule" type="Rule"
 minOccurs="0" maxOccurs="unbounded">
            <xs:annotation>
                <xs:documentation>Specifies the rule that should be
evaluated when the ActivationContext is used.</xs:documentation>
            </xs:annotation>
        </xs:element>
    </xs:sequence>
</xs:complexType>
<xs:complexType name="WebExtension">
    <xs:annotation>
        <xs:documentation>
```

Defines a Web Extension.

```
        </xs:documentation>
    </xs:annotation>
    <xs:sequence>
        <xs:element name="ID" type="xs:string" minOccurs="1" maxOccurs="1">
            <xs:annotation>
                <xs:documentation>Specifies the unique ID of the Web
Extension.</xs:documentation>
            </xs:annotation>
        </xs:element>
        <xs:element name="Version" type="xs:string" minOccurs="1"
 maxOccurs="1">
            <xs:annotation>
                <xs:documentation>Specifies the version of the Web
Extension</xs:documentation>
            </xs:annotation>
        </xs:element>
        <xs:element name="ProviderName" type="xs:string" minOccurs="1"
 maxOccurs="1">
            <xs:annotation>
                <xs:documentation>Specifies the name of the individual or company that
developed the Web Extension.</xs:documentation>
            </xs:annotation>
        </xs:element>
        <xs:element name="DefaultLocale" type="xs:string" minOccurs="1"
 maxOccurs="1">
            <xs:annotation>
                <xs:documentation>Specifies the locale in which strings are expressed by
default in this manifest.</xs:documentation>
            </xs:annotation>
        </xs:element>
        <xs:element name="FullName" type="LocaleAwareSetting" minOccurs="1"
 maxOccurs="1">
            <xs:annotation>
                <xs:documentation>Specifies the full name of the Web Extension. Full
names can have up to 255 characters.</xs:documentation>
            </xs:annotation>
```

```
        </xs:element>
        <xs:element   name="DisplayName"   type="LocaleAwareSetting"
minOccurs="1" maxOccurs="1">
            <xs:annotation>
                <xs:documentation>Specifies the display name of the Web Extension, as
displayed in host applications. Display names can have up to 32
characters.</xs:documentation>
            </xs:annotation>
        </xs:element>
        <xs:element   name="Description"   type="LocaleAwareSetting"
minOccurs="1" maxOccurs="1">
            <xs:annotation>
                <xs:documentation>Specifies the description of the Web Extension.
Descriptions can have up to 2000 characters.</xs:documentation>
            </xs:annotation>
        </xs:element>
        <xs:element   name="ProductSupportURL"   type="LocaleAwareSetting"
minOccurs="0" maxOccurs="1">
            <xs:annotation>
                <xs:documentation>Specifies the URL of the product support page of the
Web Extension.</xs:documentation>
            </xs:annotation>
        </xs:element>
        <xs:element   name="PrivacyPolicyURL"   type="LocaleAwareSetting"
minOccurs="0" maxOccurs="1">
            <xs:annotation>
                <xs:documentation>Specifies the URL of the privacy policy file of the
Web Extension.</xs:documentation>
            </xs:annotation>
        </xs:element>
            <xs:element   name="TermsOfUseURL"   type="LocaleAwareSetting"
minOccurs="0" maxOccurs="1">
                <xs:annotation>
                    <xs:documentation>Specifies the URL of the terms of use page of the Web
Extension.</xs:documentation>
                </xs:annotation>
            </xs:element>
            <xs:element   name="Thumbnail"   type="xs:string"   minOccurs="0"
maxOccurs="1">
            </xs:element>
            <xs:element   name="AllowSnapshot"   type="xs:boolean"  minOccurs="0"
maxOccurs="1">
            </xs:element>
            <xs:element   name="Services"   type="Services"   minOccurs="0"
maxOccurs="1">
            </xs:element>
            <xs:element   name="ActivationContext"   type="ActivationContext"
minOccurs="1" maxOccurs="unbounded">
                <xs:annotation>
                    <xs:documentation>Specifies where and under which conditions the Web
Extension is shown.</xs:documentation>
                </xs:annotation>
            </xs:element>
        </xs:sequence>
    </xs:complexType>
        <xs:element name="WebExtension" type="WebExtension"/>
    </xs:schema>
```

As another example, a manifest file for a gadget or inline extension can be written using the following schema definition:

```
        <?xml version="1.0" encoding="utf-8"?>
        <xs:schema targetNamespace=https://schemas.microsoft.com/.../ manifest.xsd
            elementFormDefault="qualified"
            xmlns="http://tempuri.org/XMLSchema.xsd"
            xmlns:mstns="http://tempuri.org/XMLSchema.xsd"
            xmlns:xs="http://www.w3.org/2001/XMLSchema"
        ><xs:complexType name="Lab">
            <xs:sequence>
        <xs:element name="Title" type="xs:string" ><!--This is the plain text title of the
solution. It is user facing.--></xs:element>
        <xs:element name="Location" type="xs:anyURI"><!--This is the URL/URI to
the location of the source code--></xs:element>
        <xs:element name="GUID" type="xs:string"><!--This is a unique GUID to
identify your solution--></xs:element>
```

-continued

```
    <xs:element name="Version" type="xs:string"><!--This is the version number, please format MM.mm--></xs:element>
    <xs:element name="Author" type="xs:string"><!--Authors name--></xs:element>
    <xs:element name="Description" type="xs:string" ><!--Plain text description. This is user facing--></xs:element>
    <xs:element name="icon" type="xs:anyURI"><!--This is the URL/URI to a user facing icon to be used. It should point to an image in .jpg format--></xs:element>
    <xs:element name="criteria" type="xs:string" maxoccurs="unbounded"><!--This item contains criteria for loading the solution. It should be in the form of a regular expression. There can be more than one triggering criteria.--></xs:element>
    <xs:element name="Prereq" type="xs:anyURI" maxoccurs="unbounded"><!--This is the URI to any prerequisite library to be loaded as part of the solution--></xs:element>
    </xs:sequence>
    </xs:complexType>
    </xs:schema>
```

As another example, a manifest file for a fancy box gadget (see FIG. 5F) can be configured as follows:

```
<?xml version="1.0"?>
<Lab xmlns="https://schemas.microsoft.com/office/.../*_manifest">
<Title>Gallery View</Title>
<Prereq>http://code.jquery.com/jquery-1.4.2.min.js</Prereq>
<Prereq>http://example.org/*jquery.easing-1.3.pack.js</Prereq>
<Prereq>http://example.org/*-jquery.fancybox-1.3.1.js</Prereq>
<Prereq>http://example.org/*http://example.org/
```

-continued

```
*jquery.mousewheel-3.0.2.pack.js</Prereq>
    <Location http://example.org/*fancybox.js</Location>
    <Guid>{466DF5A9-BDD2-48F8-A345-A10C5DAC8DE0}</Guid>
    <Version>1.0.0.3</Version>
    <Author>John Doe </Author>
    <Description>FancyBox Schtuff</Description>
    <Icon>http://www.example.com/ cdrom/msaggallery.jpg</Icon>
    <NoCache>false</NoCache>
</Lab>
```

For the fancy box extension or gadget, executable scripting language code can be configured as shown by the following example:

```
$(document).ready(function( ) {
    $("head").append("<link rel=\"stylesheet\" type=\"text/css\" href=\"http://example.org/*\fancybox\\jquery.fancybox-1.3.1.css\" />");
    $("a[href*=.jpg]").each(function(i){
    $(this).attr("class","picture");
    });
    $("a[href*=.png]").each(function(i){
    $(this).attr("class","picture");
    });
    $("a[href*=.jpeg]").each(function(i){
    $(this).attr("class","picture");
    });
    $("a[href*=.gif]").each(function(i){
    $(this).attr("class","picture");
    });
    $("img").wrap("<a href="+$("img").attr("src")+" id=\"picture_inline\" />");
    $("img").attr("style","border-style: none");
    $("a").fancybox({'width': '80%', 'height': '80%', 'autoScale': true,'transitionIn':'elastic','transitionOut': 'elastic','type':'iframe'});
    $(".picture").each(function(i){
    $("body").append("<div id=\"gallery\" style=\"position: fixed; bottom:0;width:100%;height:40%; border-top: 1px solid #BBB;\" />");
    $("#gallery").append("<a href="+$(this).attr("href")+" class=\"picture\" rel=\"gallery\"><img src="+$(this).attr("href")+" class=\"thumb\" style=\"border: 1px solid #BBB;padding: 2px;margin: 10px 30px 10px 0;vertical-align: top;\"></a>");
    });
    $("body").append("<div id=\"gallery\" style=\"position: fixed; bottom:0;width:100%;height:40%; border-top: 1px solid #BBB;\" />");
    // $("#gallery").append("<a href="+path+" class=\"picture\" rel=\"gallery\"><img src="+path+" class=\"thumb\" style=\"border: 1px solid #BBB;padding: 2px;margin: 10px 30px 10px 0;vertical-align: top;\"></a>");
    // };
    // }
    $(".thumb").each(function(i){
    $(this).css("width",$("#gallery").width( )/$(".thumb").size( )-50);
    $(this).css("height",$("#gallery").height( ));
    });
    $(".picture").fancybox({ 'titlePosition' : 'over','transitionIn' : 'elastic', 'transitionOut' : 'elastic'});
    $("a[rel=gallery]").fancybox({
```

```
                    'transitionIn'    : 'elastic',
                    'transitionOut'   : 'elastic',
                    'titlePosition'   : 'over',
                    'titleFormat'     : function(title, currentArray,
currentIndex, currentOpts) {
                      return '<span id="fancybox-title-over">Image '
+ (currentIndex + 1) + ' / ' + currentArray.length + (title.length ? '   ' + title : '') +
'</span>';
                    }
                });
    $("#picture_inline").fancybox({ 'titlePosition' : 'over','transitionIn' :
'elastic',
                    'transitionOut'   : 'elastic'});
        });
```

As another example, a manifest file for a shipment tracking gadget can be configured as follows:

```
<Lab>
<Title>Shipment Tracking v2</Title>
<Location http://example.org/*-Scripts\xs_tracking.js</Location>
<Guid>{D833FF8F-8C95-461B-A3B2-4FC3DC25E7D9}</Guid>
<Version>2.0.0.5</Version>
<Author>Jane Doe</Author>
```

```
<NoCache>false</NoCache>
<Description>Advanced package tracking information, provided by PackageTrackr.</Description>
<ICON> http://example.org \images\Shipment-Tracking.gif</ICON>
<Lab>
```

For the shipment tracking extension or gadget, executable scripting language code can be configured as shown by the following example:

```
// Shipment tracking gadget
// Carrier Name 1:  /\b(1Z ?[0-9A-Z]{3} ?[0-9A-Z]{3} ?[0-9A-Z]{2} ?[0-9A-Z]{4} ?[0-9A-Z]{3} ?[0-9A-Z]|[\dT]\d\d\d ?\d\d\d\d ?\d\d\d\d)\b/i
// Carrier Name 2: /\b((96\d\d\d\d ?\d\d\d\d|96\d\d) ?\d\d\d\d ?\d\d\d\d( ?\d\d\d)?)\b/i
// Carrier Name N : /\b(91\d\d ?\d\d\d\d ?\d\d\d\d ?\d\d\d\d ?\d\d\d\d ?\d\d|91\d\d ?\d\d\d\d ?\d\d\d\d ?\d\d\d\d ?\d\d\d\d)\b/i
function highlightTrackingLinks( )
{
  this.carriers = new Array( );
  this.carriers[0] = new getCarrier("Carrier Name 1");
  this.carriers[0].expression = /\b(1Z ?[0-9A-Z]{3} ?[0-9A-Z]{3} ?[0-9A-Z]{2} ?[0-9A-Z]{4} ?[0-9A-Z]{3} ?[0-9A-Z]|[\dT]\d\d\d ?\d\d\d\d ?\d\d\d\d)\b/i
  this.carriers[1] = new getCarrier("Carrier Name N");
  this.carriers[1].expression = /\b(\d\d\d\d ?\d\d\d\d ?\d\d\d\d ?\d\d\d\d ?\d\d\d\d ?\d\d\d\d ?\d\d)\b/i
  this.carriers[2] = new getCarrier("Carrier Name 2");
  this.carriers[2].expression = /\b([0-9]{15})\b/i
  this.foundTrackingNumbers = new Array( );
  this.go = function( )
  {
      var trackingNumberIndex = 0;
      // Look for carrier matches
      for(var c=0; c < this.carriers.length; c++)
      {
          var carrier = this.carriers[c];
          var matches = document.body.innerText.match(carrier.expression);
          if (matches)
          {
              for(var i=0; i < matches.length; i++)
              {
                  var foundNumber = matches[i];
                  if (carrier.unloadOverride)
                      enableOnBeforeUnloadPrompt = true;
                  if (!this.duplicateTrackingNumber(carrier.carrierName, foundNumber))
                      this.foundTrackingNumbers[trackingNumberIndex++] = new getTrackingNumber(carrier.carrierName, foundNumber);
              }
          }
      }
      if (this.foundTrackingNumbers.length > 0)
          this.insertTrackingHtml( );
  }
  this.duplicateTrackingNumber = function(carrier, foundNumber)
```

-continued

```
      {
         for(var i=0; i< this.foundTrackingNumbers.length; i++)
         {
            if (carrier == this.foundTrackingNumbers[i].carrier &&
foundNumber == this.foundTrackingNumbers[i].number)
                  return true;
         }
         return false;
      }
      this.insertTrackingHtml = function ( ) {
         var body = document.getElementsByTagName("body")[0];
         for (var i = 0; i < this.foundTrackingNumbers.length; i++) {
            var trackingNumber = this.foundTrackingNumbers[i];
            var trackingFrame = document.createElement("iframe");
            with (trackingFrame) {
               id = "trackingElement" + i;
               width = "300";
               height = "400";
               scrolling = "yes";
               border = "4"
               src = trackingNumber.linkUrl( );
               style.cssText = "float: right";
               name = "trackingElement" + i;
            }
            body.insertBefore(trackingFrame, body.childNodes(0));
         }
      }
   }
   function getTrackingNumber(carrier, number)
   {
      this.carrier = carrier;
      this.number = number;
      this.linkUrl = function( )
      {
         //http://www.example.com/m/track?n=1Z5R89391302318793&c=  Carrier
Name 1
         if (carrier == " Carrier Name 1")
            //return                                                "
http://example.orgprocessInputRequest?sort_by=status&error_carried=true&tracknums_displayed=
1&TypeOfInquiryNumber=T&loc=en-us&InquiryNumber1=" + this.number +
"&AgreeToTermsAndConditions=yes";
               return "http://www.example.com/m/track?n=" + this.number +
"&c= Carrier Name 1#content";
         else if (carrier == " Carrier Name N")
            //return      "http://     Carrier    Name    N.com/
/InterLabelInquiry.do?origTrackNum=" + this.number;
               return "http://www.example.com/m/track?n=" + this.number +
"&c= Carrier Name N#content";
         else
               return "http://wwwexample.com/m/track?n=" + this.number +
"#content";
      }
   }
   function getCarrier(carrier)
   {
      this.carrierName = carrier;
      this.unloadOverride = false;
   }
   var enableOnBeforeUnloadPrompt = false;
   function trackingEngineUnloadHandler( )
   {
      if (enableOnBeforeUnloadPrompt)
            return "Select cancel to continue reading this e-mail message";
   }
   function trackingEngineLoadHandler( )
   {
      var trackingEngine = new highlightTrackingLinks( );
      trackingEngine.go( );
   }
   window.attachEvent("onload", trackingEngineLoadHandler);
   window.attachEvent("onbeforeunload", trackingEngineUnloadHandler);
   Other examples are available and configurable.
```

FIGS. 5A-5F depict aspects of an exemplary email application interface 500 used in part to provide extensibility features associated with an email application. For example, the interface 500 can be used as part of a web-based or locally installed email application to view selected emails. As shown in FIG. 5A, the exemplary interface 500 includes a number of available gadgets 502-514 and a selection box 516 that a user can select to enable a particular gadget or gadgets. As a user hovers over each gadget, a selection box can be configured to surface for the corresponding gadget.

Enabled gadgets can automatically surface for selected email items according to the particular activation trigger, as described in detail above.

Figure 5B:
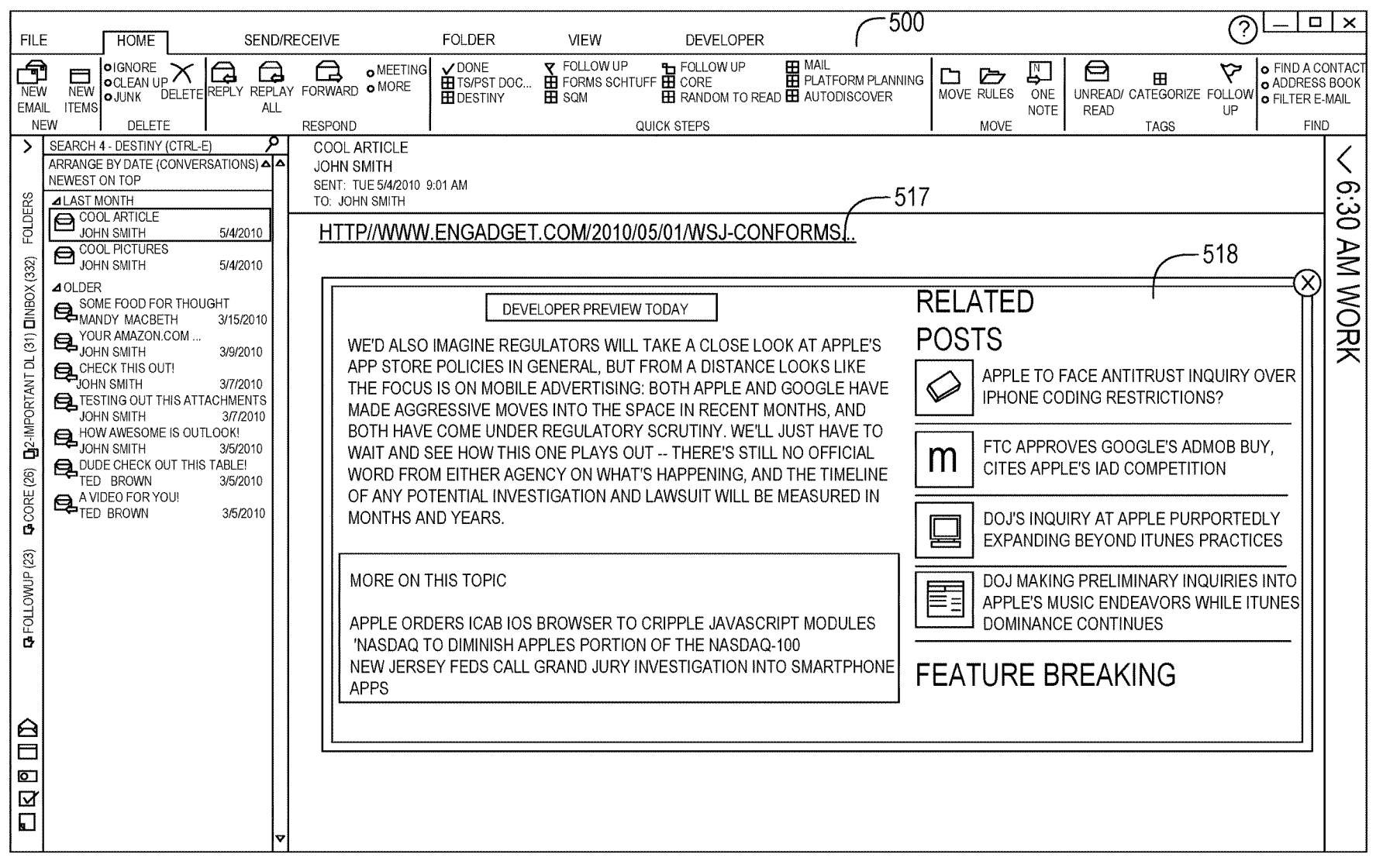

FIG. 5B shows the exemplary email application interface 500 including a link 517 and the automatically embedded content 518 associated with the link 517 after having been automatically injected into the email message due to the activation of an associated gadget triggered by identification of the link 517.

Figure 5C:
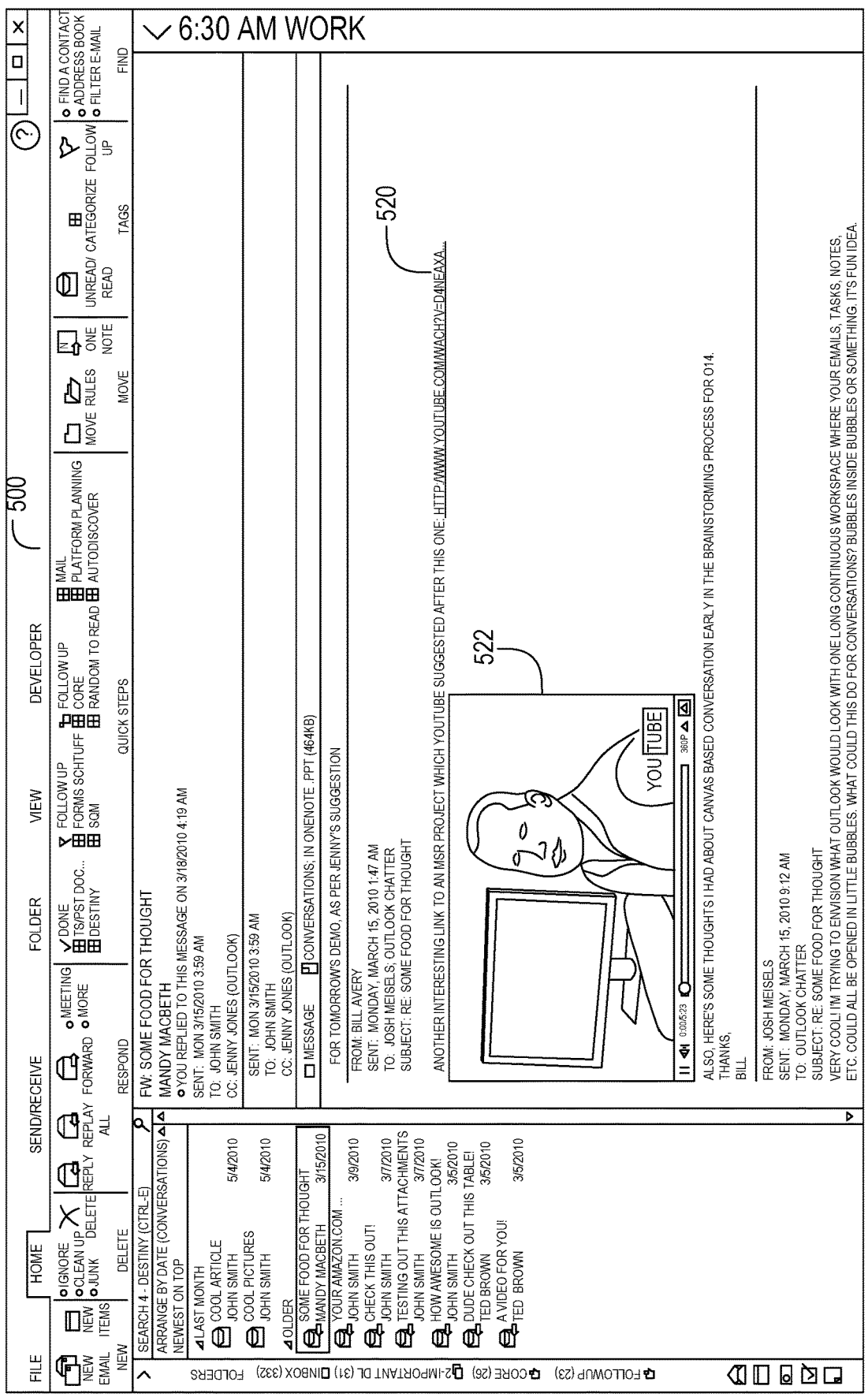

FIG. 5C shows the exemplary email application interface 500 including a link 520 and the automatically embedded video 522 associated with the link 520 after having been automatically injected into the email message due to the activation of an associated gadget triggered by identification of the link 520.

Figure 5D:
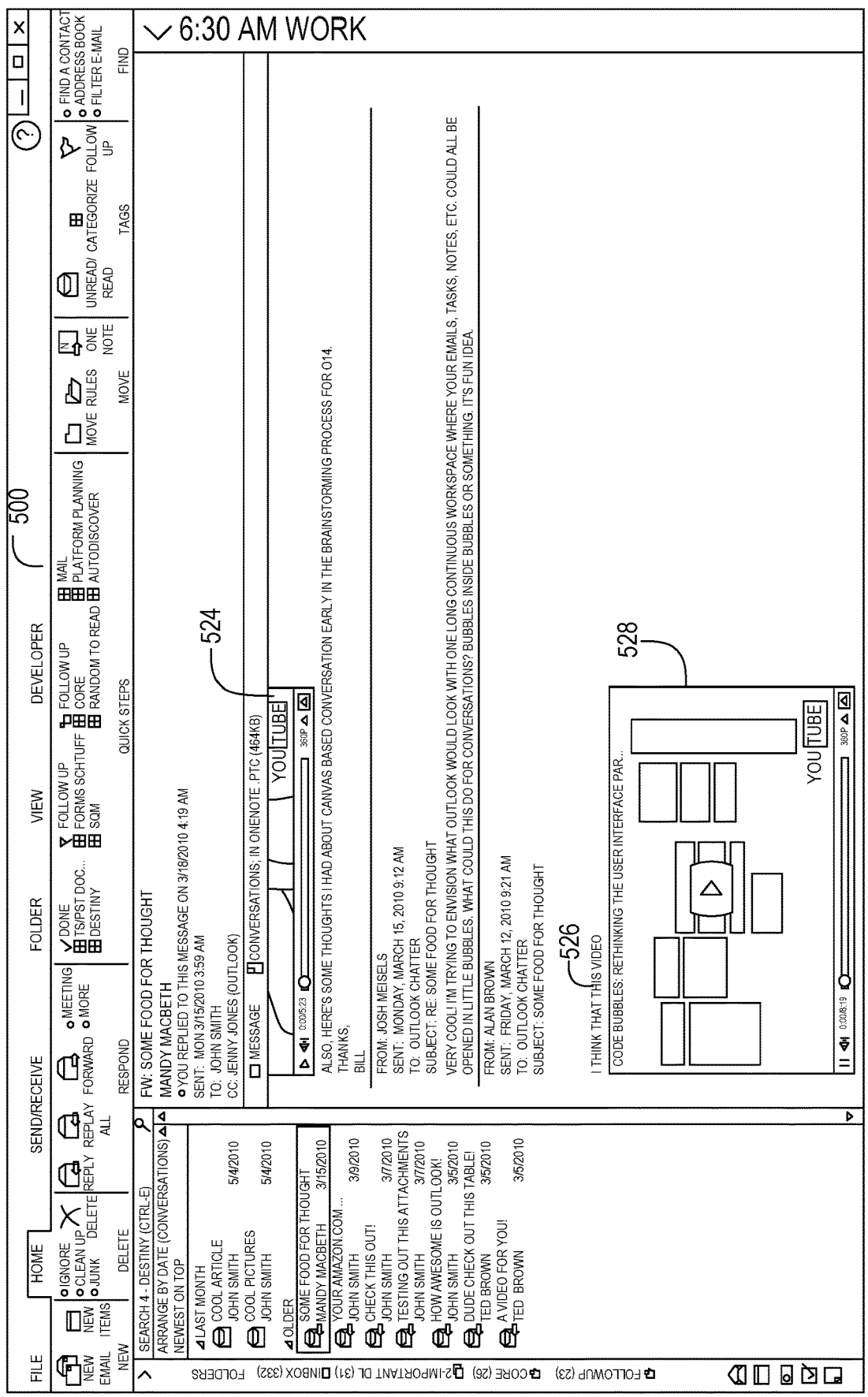

FIG. 5D shows the exemplary email application interface 500 including a link 526 and an automatically embedded video 528 associated with the link 526 after having been automatically injected into the email message due to the activation of an associated gadget triggered by identification of the link 526. The exemplary email application interface 500 also is displaying another embedded video 524 having been triggered by another link.

Figure 5E:
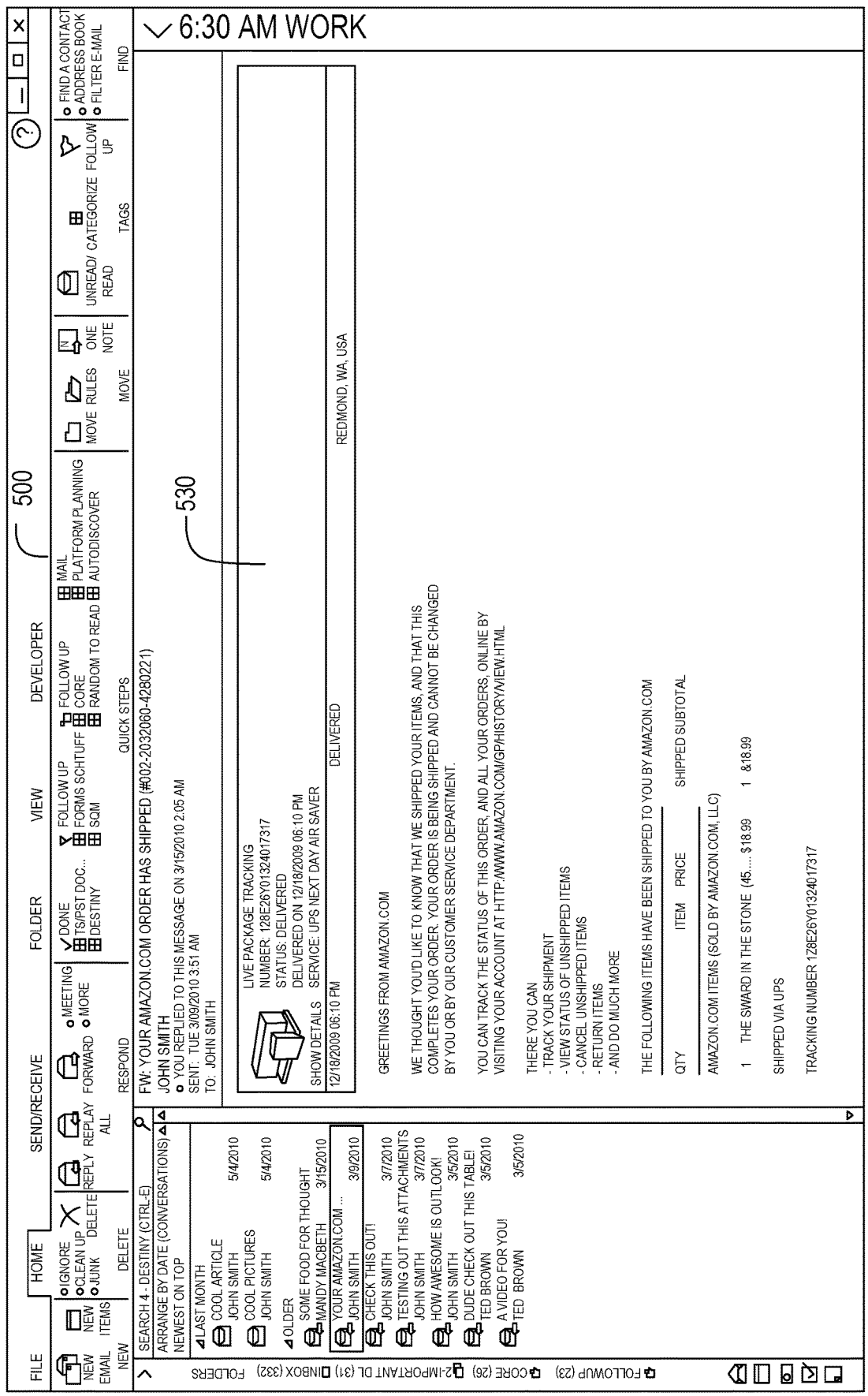

FIG. 5E shows the exemplary email application interface 500 including automatically embedded active package tracking content 530 having been automatically injected into the email message due to the activation of an associated gadget triggered by identification a tracking number or numbers or other package transport criteria.

Figure 5F:
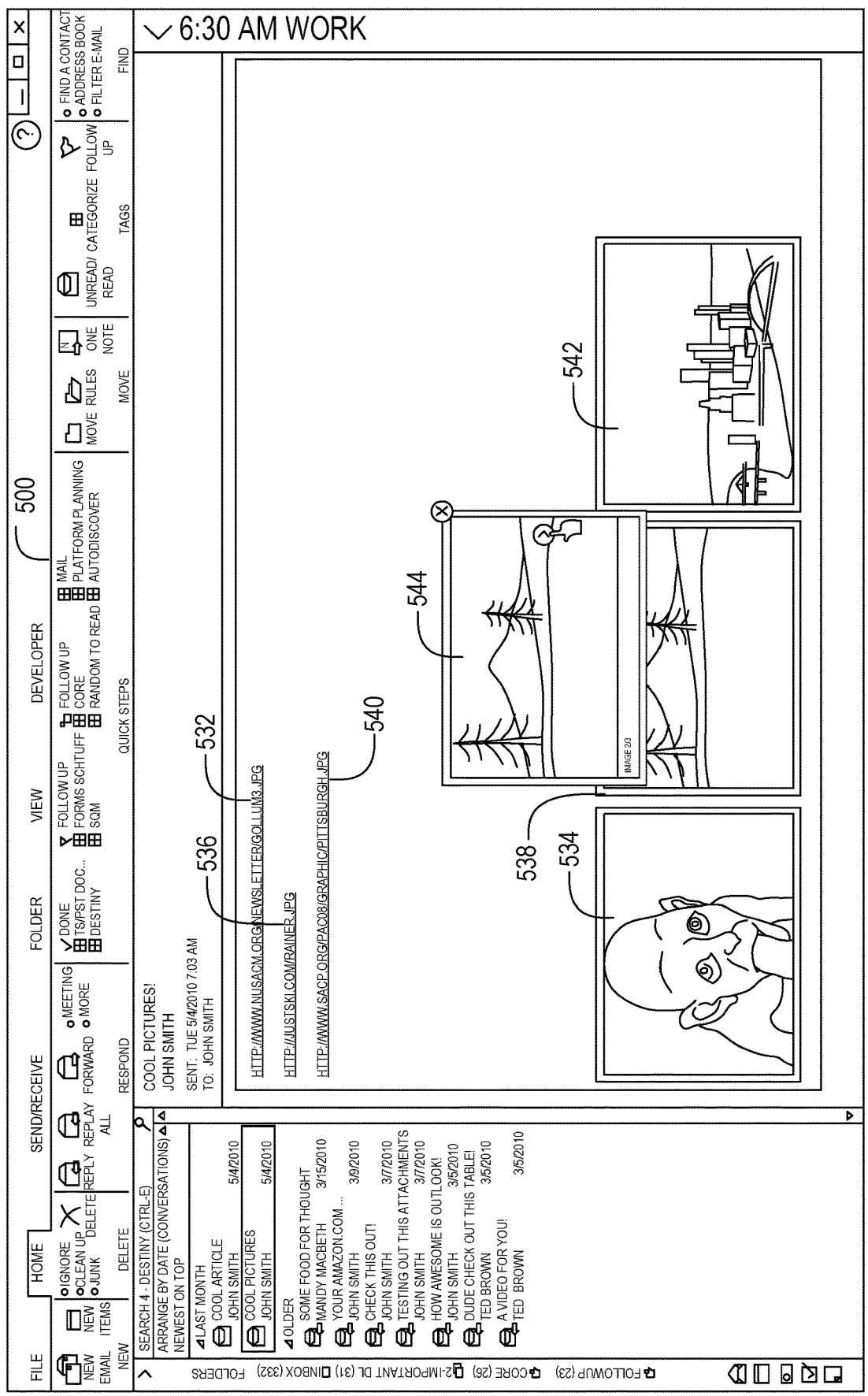

FIG. 5F shows the exemplary email application interface 500 including a link 532 and automatically embedded associated photo 534, link 536 and automatically embedded associated photo 538, and link 540 and automatically embedded associated photo 542, wherein the photos 534, 538, and 542 have been automatically injected into the email message due to the activation of an associated gadget triggered by identification of the links 532, 536, and 540, respectively. As shown in FIG. 5F, the triggered gadget also enables interaction with the injected photos using rich-featured photo viewer 544.

It will be appreciated that the extensibility features can be implemented as part of a processor-driven computer environment. Also, while certain embodiments are described herein, other embodiments are available, and the described embodiments should not be used to limit the claims. Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations.

The term computer readable media as used herein can include computer storage media. Computer storage media can include volatile and nonvolatile, removable and non-removable media implemented in any method or technology for storage of information, such as computer readable instructions, data structures, program modules, etc. System memory, removable storage, and non-removable storage are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components which include, but are not limited to, wide area networks (WANs), local area networks (LANs), metropolitan area networks (MANs), proprietary networks, backend networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, cloud, network, and other terminology, generally describe a computer-related operational environment that includes hardware, software, firmware and/or other items. A component can use processes using a processor, executable, and/or scripting code. Exemplary components include an application, a server running on the application, and/or a electronic communication client coupled to a server for receiving communication items. Computer resources can include processor and memory resources such as: digital signal processors, microprocessors, multi-core processors, etc. and memory components such as magnetic, optical, and/or other storage devices, smart memory, flash memory, etc. Communication components can be used to carry computer-readable information as part of transmitting, receiving, and/or rendering electronic communication items using a communication network or networks, such as the Internet for example. Other embodiments and configurations are included and available.

Exemplary Operating Environment

Figure 6:
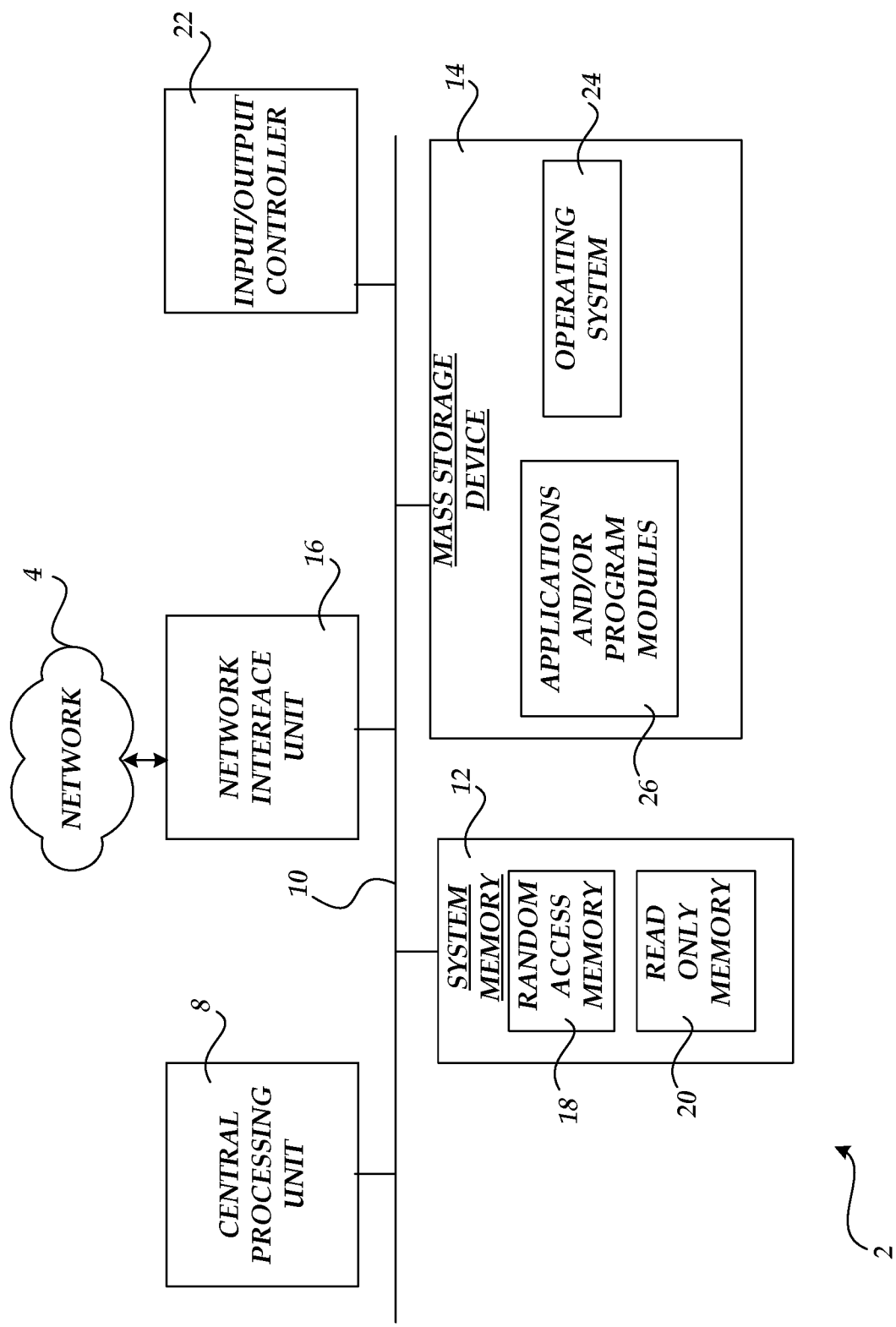
FIG. 6 is a block diagram illustrating an exemplary computing environment for implementation of various embodiments described herein.

Referring now to FIG. 6, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 6, an illustrative operating environment for embodiments of the invention will be described. As shown in FIG. 6, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow

What is claimed is:

1. A method comprising:
    receiving, by an electronic communication client, an electronic communication item;
    receiving, by the electronic communication client, a selection of the electronic communication item;
    in response to receiving the selection, parsing the electronic communication item;
    identifying, using a solution package, an activation trigger in the parsed electronic communication item, wherein the solution package comprises the activation trigger as a regular expression to extend a functionality of the electronic communication client by adding content within the electronic communication item;
    based on the identification of the activation trigger in the parsed electronic communication item, causing code of the solution package to be executed in an environment separate from the electronic communication client;
    receiving, by the electronic communication client from the separate environment, the content to be added within the electronic communication item in response to the executing of the code within the separate environment; and
    causing display of the electronic communication item with the content added at the electronic communication client.

2. The method of claim 1, further comprising:
    parsing another electronic communication item; and
    based on an absence of the activation trigger in the parsed other communication item, causing display of the other electronic communication item in a user interface of the electronic communication client without extending the functionality of the electronic communication client to add content within the other electronic communication item.

3. The method of claim 1, wherein receiving the selection of the electronic communication item comprises:
receiving the selection via a user interface of the electronic communication client.

4. The method of claim 1, wherein the code of the solution package includes third party code and communicates with another resource to populate an identified portion of the electronic communication item with the content to be added in response to execution of the code.

5. The method of claim 1, wherein the solution package includes a manifest that comprises the activation trigger, and identifying the activation trigger comprises using the manifest of the solution package to identify the activation trigger in the parsed electronic communication item.

6. The method of claim 1, further comprising retrieving the solution package from one or more of remote and local computer storage.

7. The method of claim 1, wherein the electronic communication client is a local email application.

8. The method of claim 1, wherein the electronic communication client is a web-based email application.

9. The method of claim 1, further comprising creating the solution package using one or more of markup language, style sheet language, and scripting language features.

10. The method of claim 1, wherein:
the code is scripting language code; and
the method further comprises executing the scripting language code to return a markup stream as the content to be added within the electronic communication item.

11. The method of claim 1, wherein the environment separate from the electronic communication client in which the code is executed is an isolation sandbox.

12. The method of claim 1, wherein different types of content are added within the electronic communication item based on a type of the activation trigger identified within the parsed electronic communication item.

13. The method of claim 1, wherein:
the solution package is a compressed package; and
the method further comprises unpacking the compressed package to retrieve the code for execution.

14. The method of claim 1, wherein causing display of the electronic communication item with the content added at the electronic communication client comprises causing display of the electronic communication item in a user interface of the electronic communication client.

15. The method of claim 1, wherein:
the electronic communication client is an email application;
the solution package is stored as a hidden electronic message in a user mailbox of the email application; and
the method further comprises retrieving the solution package from the hidden electronic message.

16. A system comprising:
a processor; and
a memory storing instructions that, when executed by the processor, cause the system to:
receive, by an electronic communication client, an electronic communication item;
receive, by the electronic communication client, a selection of the electronic communication item;
in response to receiving the selection, parsing, by the electronic communication client, the electronic communication item;
identify, by the electronic communication client, one or more activation triggers in the parsed electronic communication item using a solution package, wherein the solution package comprises each identified activation trigger as a regular expression to extend a functionality of the electronic communication client by adding content within the electronic communication client;
based on the identification of the one or more activation triggers in the parsed electronic communication item, cause code of the solution package to be executed in an environment separate from the electronic communication client;
receive, by the electronic communication client from the separate environment, the content to be added within the electronic communication item in response to the executing of the code within the separate environment; and
cause display of the electronic communication item with the content added at the electronic communication client.

17. The system of claim 16, wherein the code of the solution package includes scripting language code such that a markup language stream is returned as the content to be added within the electronic communication item upon execution of the code.

18. The system of claim 17, wherein the solution package includes a manifest file that comprises the one or more activation triggers, and the manifest file of the solution package is used to identify the one or more activation triggers in the parsed electronic communication item.

19. The system of claim 16, wherein the code includes third party code and communicates with other resources to populate an identified portion of the electronic communication item with the content to be added in response to execution of the code.

20. A computer storage device, including instructions which, when executed, comprise:
receiving, by an electronic communication client, an electronic communication item;
receiving, by the electronic communication client, a selection of the electronic communication item;
in response to receiving the selection, parsing the electronic communication item;
identifying, using a solution package, one or more activation triggers in at least one parsed portion of the electronic communication item, wherein the solution package comprises each of the one or more activation triggers as a regular expression to extend a functionality of the electronic communication client by adding content within the electronic communication item;
based on the identification of the one or more activation triggers in the parsed electronic communication item, causing code of the solution package to be executed in an environment separate from the electronic communication client;
receiving, by the electronic communication client from the separate environment, the content to be added within the electronic communication item in response to the executing of the code within the separate environment; and
causing display of the electronic communication item with the content added at the electronic communication client.

* * * * *